United States Patent [19]
Grossman et al.

[11] Patent Number: 5,509,761
[45] Date of Patent: Apr. 23, 1996

[54] DRILL

[75] Inventors: Günter Grossman, Krefeld, Germany; Yoshikazu Iwata, Gifu, Japan

[73] Assignee: Mitsubishi Materials Corporation, Tokyo, Japan

[21] Appl. No.: 123,380

[22] Filed: Sep. 20, 1993

[30]     Foreign Application Priority Data

Sep. 19, 1992 [DE]  Germany ..................... 42 31 381.3

[51] Int. Cl.$^6$ ...................................... B23B 51/02
[52] U.S. Cl. ....................... 408/59; 408/223; 408/226; 408/230
[58] Field of Search ..................... 408/59, 223, 224, 408/226, 227, 229, 230, 713, 231, 233

[56]            References Cited

U.S. PATENT DOCUMENTS

| | | | |
|---|---|---|---|
| 4,137,002 | 1/1979 | Barker et al. ................. | 408/59 |
| 4,220,429 | 9/1980 | Powers et al. . | |
| 4,558,975 | 12/1985 | Hale ................. | 408/223 |
| 4,606,680 | 8/1986 | Striegl ................. | 408/233 |
| 4,648,760 | 3/1987 | Karlsson et al. ................. | 408/223 |
| 4,889,455 | 12/1989 | Karlsson et al. ................. | 408/227 |
| 5,092,718 | 3/1992 | Shallenberger ................. | 408/229 |

FOREIGN PATENT DOCUMENTS

| | | |
|---|---|---|
| 0549548 | 11/1992 | European Pat. Off. . |
| 2730418 | 7/1977 | Germany . |
| 2848227 | 4/1980 | Germany ............... 408/226 |
| 3545586 | 12/1985 | Germany . |
| 3826239 | 2/1990 | Germany ............... 408/230 |
| 1276446 | 12/1986 | U.S.S.R. ............... 408/59 |
| 89/02328 | 3/1989 | WIPO . |

*Primary Examiner*—Daniel W. Howell
*Attorney, Agent, or Firm*—Armstrong, Westerman, Hattori, McLeland & Naughton

[57]              ABSTRACT

A drill includes a substantially cylindrical bit body 10 having an axis O. The bit body 10 has a flange portion 13 which includes a converging portion 13a which reduces its diameter progressively towards the front end of the bit body and a flange 13b which is provided with a rearwardly facing annular surface 13c. The annular end surface is contactable with the front end surface of a drill holding portion of a machine too. Chip discharging flutes 14A,14B, each having an inner surface constituted by first and second inner surface portions 14a,14b and a third inner surface portion 14c arcuately recessed therefrom, are formed in the front end portion of the tip body 10. An inner peripheral cutting insert 16A and an outer peripheral cutting insert 16B are mounted on the ends of the chip-discharging flutes 14A,14B. The cross-sectional area $S_A$ of the first-mentioned chip-discharging flute 14A is determined to be greater than that $S_B$ of the second-mentioned chip-discharging flute 14B. A plurality of grooves 25 are formed in the third inner surface portion 14c so as to extend along each chip-discharging flute.

26 Claims, 11 Drawing Sheets

DRILL

FIELD OF THE INVENTION

The present invention relates to a drill of the type having a bit body and cutting tips or inserts which form a bottom cutting edge.

DESCRIPTION OF THE RELATED ART

Hitherto, a drill as shown in FIG. 20 has been known as a drill of the kind mentioned above. This drill is disclosed in Japanese Utility Model Laid-Open No. 62-201612. The drill has a bit body 1 adapted to rotate about an axis O and an inner peripheral cutting insert 2 and an outer peripheral cutting insert 3 which are mounted on a front end of the bit body 1.

The cutting inserts 2, 3 are positive inserts or cutting inserts which, when viewed in plan, have a generally regular triangular form of the same size. Each side ridge of the triangle forms a straight cutting edge portion 4. Nose cutting edge portions 5, 5 are formed on both sides of each apex of the triangular form insert. The nose cutting edge portion 5 has an angle greater than the angle of the apex. An inter-nose rounded cutting edge portion 6 is formed between two adjacent nose cutting edge portions. An inter-edge cutting edge portion 7 is formed at each point where each end of each nose cutting edge portion 5 intersects the adjacent straight cutting edge portion 4. In FIG. 20, reference numeral 8 designates a chip-discharging flute formed in the bit body 1.

The inner cutting insert 2 has a bottom cutting edge portion which is constituted by one of the straight cutting edge portions 4 and the nose cutting edge portion 5 which is adjacent to the radially inner end of the above-mentioned straight cutting edge portion 4. The inner cutting insert 2 is mounted on the bit body 1 such that the intermediate rounded cutting edge portion 7, which is between the straight cutting edge portion 4 and the nose cutting edge portion 5 which form the bottom cutting edge portion, projects forwardly from the front end of the bit body 1 in the direction of the axis O. In addition, the inner cutting insert 2 is mounted in such a manner that one of the inter-nose rounded cutting edge portion 6 adjacent to the nose cutting edge portion 5 of the bottom cutting edge is placed radially across the axis of rotation O of the bit body 1.

Referring now to the outer peripheral cutting insert 3, this cutting insert 3 also has a bottom cutting edge which is constituted by one of the straight cutting edge portions 4 and the nose cutting edge portion 5 which is adjacent to the radially outer end of this straight cutting edge portion 4. The outer peripheral cutting insert 3 is mounted on the bit body such that the intermediate rounded cutting edge portion 7, which is between the straight cutting edge portion 4 and the nose cutting edge portion 5 which form the bottom cutting edge portion, projects forwardly from the front end of the bit body 1 in the direction of the axis O. At the same time, the outer peripheral cutting insert 3 is so disposed that the nose cutting edge portion 5, which is connected through the inter-nose rounded cutting edge portion 6 to the nose cutting edge portion 5 of the bottom cutting edge, extends rearward and radially inward towards the axis O.

As shown in FIG. 21, the inner and outer peripheral cutting inserts 2, 3 are so arranged that the loci of rotation of the straight edges 4, 4 forming the bottom cutting edge of both cutting inserts cross each other at a point P in a plane containing the axis O, and that the inter-edge rounded cutting edge portions 7, 7 of both cutting inserts, which project forwardly, rotate on a plane which is determined by an imaginary line L which is perpendicular to the axis O.

This type of drill provides an advantage in that, by suitably selecting the position of the point P at which the loci of both straight cutting edge portions 4, 4 cross each other, it is possible to use each cutting insert both as the inner peripheral cutting insert 2 and the outer peripheral cutting insert 3. Thus, each cutting insert can be adapted to different uses, which improves the efficiency of use of such cutting insert. However, certain problems are encountered with this type of drill.

In the above-described known drill, the cutting inserts 2, 3 forming the bottom cutting edges are disposed with radially inward and outward offsets with respects to the axis, so that the straight cutting edge portion 4 and the nose cutting edge portion 5 forming the bottom cutting edge or one of these two inserts are asymmetrical with those of the other cutting insert with respect to the axis O. Consequently, different levels of cutting forces act on different cutting inserts: namely, the outer peripheral cutting insert 3, which rotates at a greater radius than the inner peripheral cutting insert 2, receives a greater resistance, i.e., a greater cutting force, than the inner peripheral cutting insert 2, during the rotation of the bit body 1. Consequently, an unbalanced radial force is exerted on the bit body 1, tending to cause vibration or shiver of the bit body 1 during the drilling, resulting in degradation in the machining precision or degradation of the state of the machined surface.

The problem of degradation in machining precision and machined surface state, caused by vibration or shiver of the tool, is serious not only in the drills of the described type having asymmetrical cutting edges 4, 5 but also in boring tools or drills having large values of L/D ratio for forming small-diameter bores, regardless of whether the tool or drill is of the indexable type.

SUMMARY OF THE INVENTION

Thus, a primary object of the present invention is to provide a drill which can suppress vibration or shiver of the bit body, even when cutting edges providing the bottom cutting edge are arranged asymmetrically or even when the L/D ratio is large.

To achieve this object, according to the present invention, there is provided a drill comprising a substantially cylindrical bit body, a pair of chip-discharging flutes formed in the outer peripheral surface of the bit body so as to open in the front end surface of the bit body and to extend rearward therefrom along and at both sides of the axis of the bit body, and cutting members having cutting edge portions constituting a bottom cutting edge, wherein the bit body has a flange portion which includes a converging portion the diameter of which progressively decreases along the axis towards the front end and a substantially disk-shaped flange connected to the converging portion and having a rearwardly facing annular end surface, the annular end surface being contactable with the front end surfaces of a drill holding portion of a machine which rotatably holds the bit body substantially over the entire area of the annular end surface.

In the drill of the invention having features described above, the annular surface of the flange formed on the bit body is placed in contact with the front end surface of the machine tool over the entire area thereof. The drill, therefore, can be held by the holding portion by making a contact therewith over an increased area of contact, thus exhibiting a greater rigidity of mounting. Consequently, the vibration and shiver of the bit body during drilling can be greatly suppressed.

Furthermore, the converging portion of the flange portion, in which the diameter progressively decreases towards the front end, effectively provides a rigid support for the front end portion of the bit body which receives the cutting resistance force, thus contributing to further reduction in the vibration and shiver.

The present invention and the advantages provided thereby will be more fully understood with reference to the following detailed description of the preferred embodiments taken in conjunction with the accompanying drawings.

DESCRIPTION OF THE PREFERRED EMBODIMENTS

Figure 1:
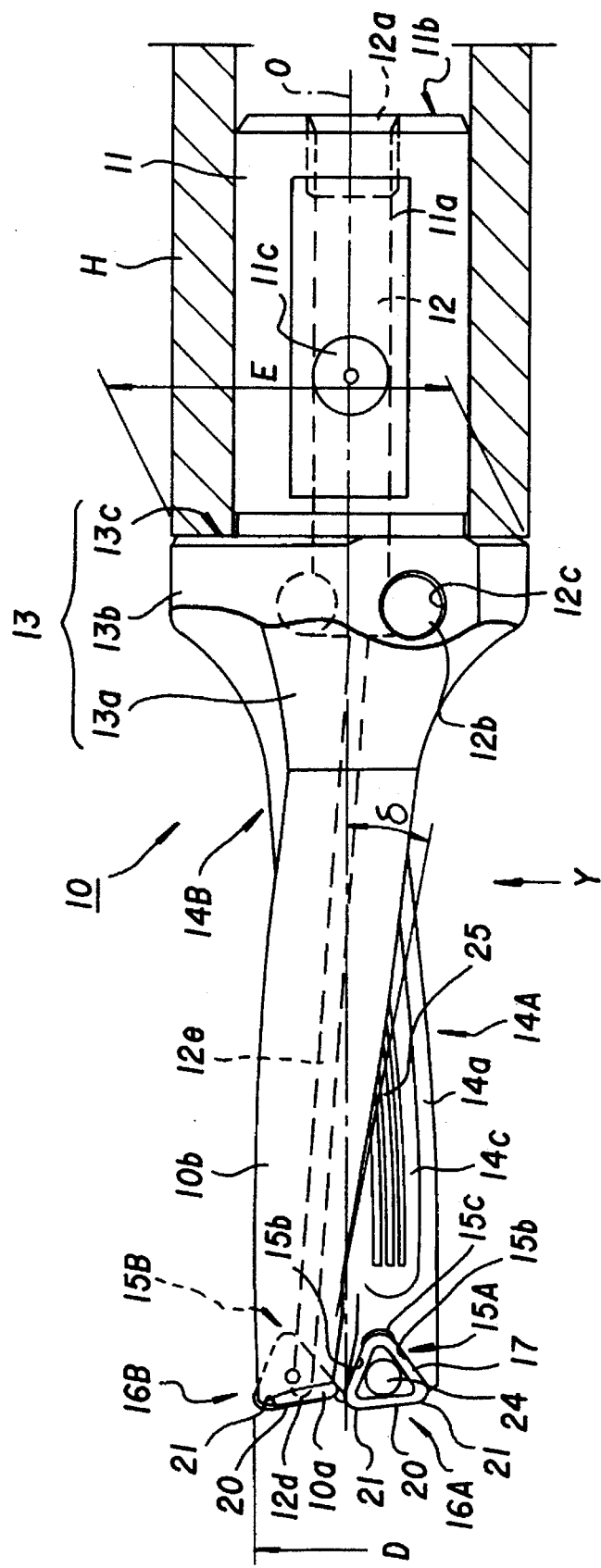
FIG. 1 is a side elevational view of an embodiment of the present invention.

With reference to the drawings wherein like reference numerals designate the same or like parts throughout, there is shown in FIGS. 1–7 a first preferred embodiment of the invention.

This embodiment has a bit body 10 having a cylindrical shaft-like form and made front a steel or the like material. The rear end portion of the bit body 10, at which the bit body 10 is mounted on a machine tool such as a machining center, is referred to as a shank and is denoted by 11. At least one flat surface 11a is formed on the shank 11 so as to extend in the direction of the axis O of the bit body 10, for enabling the bit body 10 to be fixed to the machine tool mentioned above.

An oil passage bore 12 is formed in the shank 11 so as to extend along the axis O, for the purpose of supplying a cutting oil to the tip end of the tool. The oil passage bore 12 opens in the rear end surface 11b of the shank 11, as at 12a.

A flange 13 is formed on the front end of the shank 11, at a substantially mid portion of the bit body 10 in the direction of the axis O.

In the illustrated embodiment, the flange 13 has a frusto-conical converging portion which converges forwardly to reduce its diameter toward the tip end of the bit body 10, and a disk-shaped flange portion 13b connected to the rear end of the converging portion 13a. The rearwardly facing surface of the flange portion 13b forms an annular surface 13c. When the bit body 1 is secured to a cylindrical holding portion H of the machine tool, e.g., a spindle of a lathe, the annular surface 13c makes contact with the front end surface of such a holding portion substantially over the entire area thereof.

The end surface 13c has a diameter E which is suitably determined in accordance with factors such as the size of the bit body 10, machining condition, and so forth. Preferably, however, the diameter E is determined to fall within the range between 1.1 X D and 3.0 X D, representing by D the outside diameter of the bottom cutting edge which will be mentioned later.

Radial holes 12b are formed in the flange portion 13b of the flange 13 so as to extend radially inward of the bit body 10 from the peripheral surface of the flange portion 13b so as to communicate with the above-mentioned oil passage bore 12. The radial holes 12b open in the peripheral surface of the flange portion as at 12c. The opening 12c in the flange peripheral surface and the opening 12a in the rear end surface of the shank 11 have female screw threads of the same nominal diameter. When the cutting oil is supplied from either one of the openings 12a, 12c, a plug (not shown) is screwed into the other opening so as to close the other opening.

Figure 2:
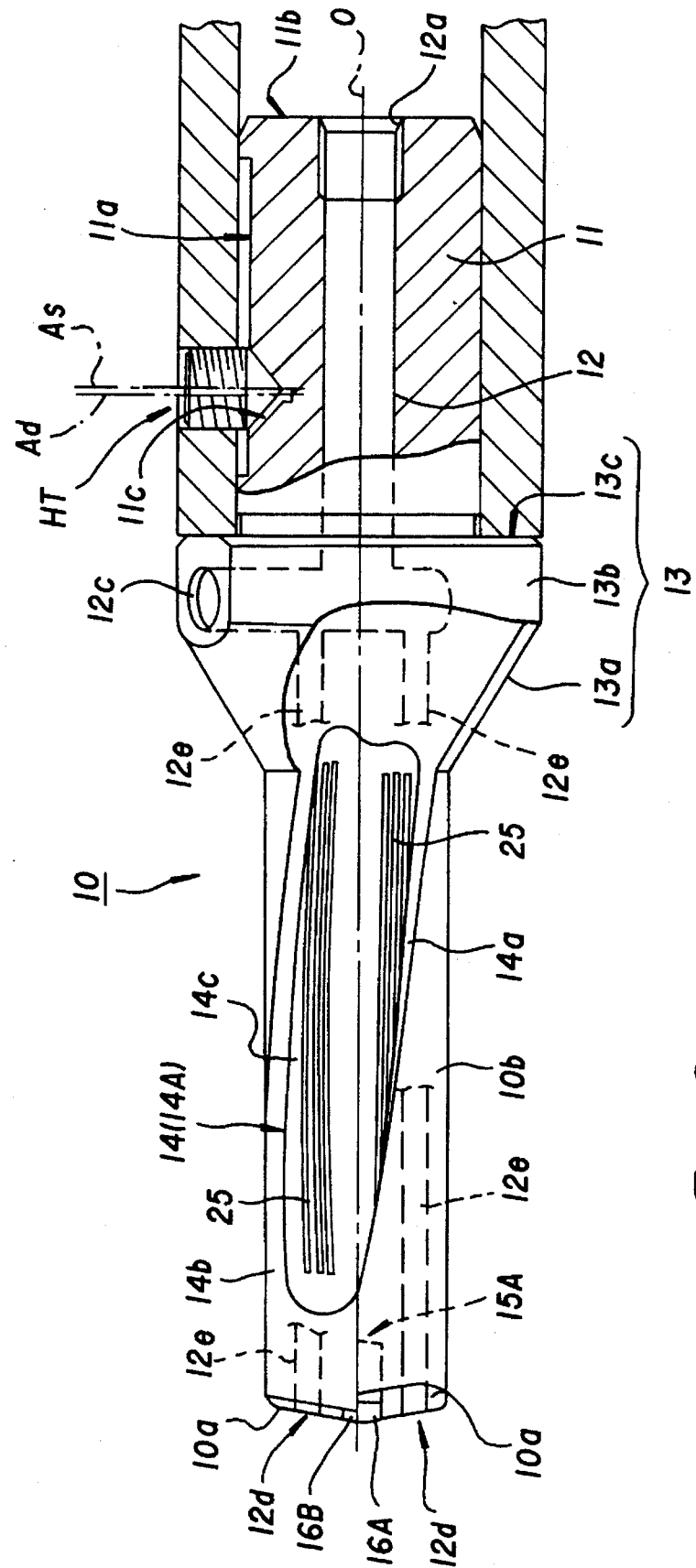
FIG. 2 is a side elevational view of the embodiment shown in FIG. 1 as viewed in the direction of an arrow Y.

A pair of chip-discharging flutes 14A, 14B, which open in the end surface 10a of the bit body 10 and which extend towards the rear end of the bit while spirally twisting about the axis O, are formed in the outer peripheral surface of the front end of the bit body 10, so as to be positioned on diametrically opposite sides of the axis O. The spiral angle a of each flute 14A, 14B is set to be 10° in this embodiment. As shown in FIGS. 1 and 2, the chip-discharging flutes 14A, 14B extend rearward from the front end of the bit body 10 to the front end of the flange 13 and further to the flange portion 13b past the converging portion 13a of the flange 13, so as to merge in the outer peripheral surface of the bit body 10.

Figures 3, 4:
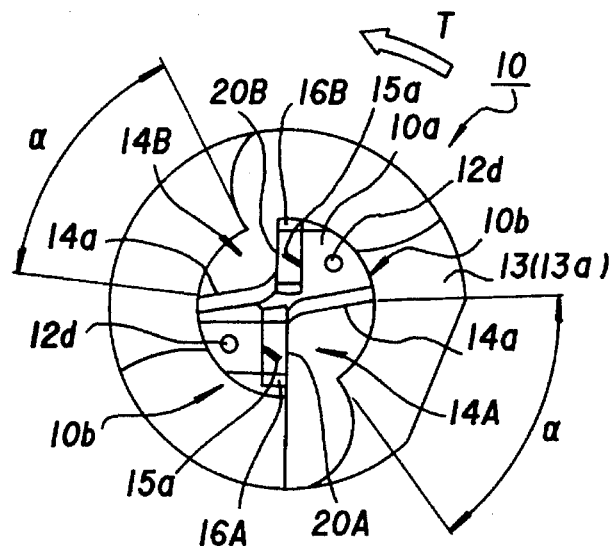
FIG. 3 is a front elevational view of the embodiment shown in FIG. 1 as viewed from the front side.
FIG. 4 is a sectional view of a front end portion of a bit body 10 incorporated in the embodiment shown in FIG. 1, taken along a plane perpendicular to the axis O of the bit body.
Figure 5:
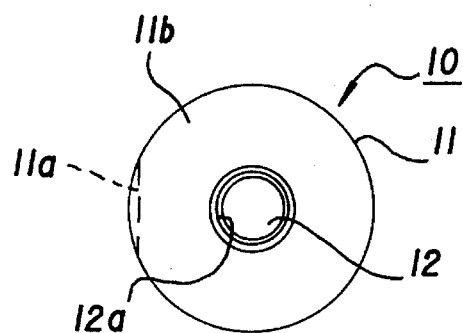
FIG. 5 is a rear end view of the embodiment shown in FIG. 1.

As shown in FIG. 3, the angle α of twist of each hip-discharging flute 14A, 14B about the axis O down to the front end of the flange 13 is determined to range up to 90°. Therefore, the above-mentioned spiral angle δ is determined on the basis of the twisting angle α and the length of the projecting front end portion of the bit body 10.

In the illustrated embodiment, each of the chip-discharging flutes 14A and 14B has an inner surface composed of a first inner surface portion 14a which is directed in the direction of rotation of the bit body 10 (counterclockwise as indicated by arrow T in FIG. 4), a second inner surface portion 14b which is formed to cross the first inner surface portion and directed counter to the direction of rotation, and a third inner surface portion 14c which interconnects the first and second inner surface portions 14a, 14b and which is disposed at the radially inner side of the first and second inner surface portions.

The first inner surface portions 14a, 14a of both chip-discharging flutes 14A, 14B are substantially parallel to each other, when viewed in a cross-sectional plane perpendicular to the axis of the axis O. Similarly, the second inner surface portions 14b, 14b of both chip-discharging flutes 14A, 14B are substantially parallel to each other, when viewed in a cross-sectional plane perpendicular to the axis of the axis O. Therefore, in the cross-sectional plane perpendicular to the axis O, the angle Ω formed between the extensions of the first and second inner surface portions 14a, 14b of one of the chip-discharging flutes 14A is equal to that of the other chip-discharging flutes 14B. These chip-discharging flutes 14A, 14B also are configured such that the flute width $W_A$ of one of the flutes 14A, in terms of circumferential distance between the first and second inner surface portions 14a, 14b, is greater than that $W_B$ of the other flute 14B.

In the illustrated embodiment, the third inner surface portion 14C interconnecting the first and second inner surface portions 14a, 14b does not extend over the entire length of each chip-discharging flute. More specifically, the third inner surface portion 14c extends from a point which is slightly spaced rearward from the front end of the chip-discharging flute 14A, 14B as shown in FIG. 1 to the front end 13a of the flange 13 as shown in FIG. 2.

As shown in FIG. 4, the third inner surface portion 14c forms a recess of a substantially arcuate cross-section when taken along a plane perpendicular to the axis O. In the illustrated embodiment, the radius R of the arcuate cross-section of the third inner surface portion 14c in one 14A of the pair of chip-discharging flutes is equal to that in the other 14B of the chip-discharging flute. This, however, is only illustrative and the arrangement may be such that the radius R of the arcuate cross-section of the third inner surface portion 14c in one 14A of the pair of chip-discharging flutes is greater than that in the other 14B of the chip-discharging flute.

The angles $β_{A1}$, $β_{B1}$ of the corners at which the first and third inner surface portions 14a, 14c cross each other in the respective chip-discharging flutes 14A, 14B, as well as the angles $β_{A2}$, $β_{B2}$ of the corners at which the second and third inner surface portions 14b, 14c cross each other in the respective chip-discharging flutes 14A, 14B, are all obtuse angles. The third inner surface portion 14c is recessed to have an arcuate cross-section, as explained before. Therefore, the angle β of crossing is defined as the angle formed between a line tangent to the arcuate cross-section of the third inner surface portion 14c at the above-mentioned corner and the plane of the first or second inner surface portion 14a, 14b.

The arrangement also is such that, in a cross-sectional plane perpendicular to the axis O, the distance $d_A$ between the axis O and the center $X_A$ of the arcuate cross-section of the third inner surface portion 14c of one of the chip-discharging flutes 14A is smaller than the distance $d_B$ between the axis O and the center $X_B$ of the arcuate cross-section of the third inner surface portion 14c of the other chip-discharging flute 14B.

Due to the above-described geometry and the inner surface portions 14a, 14b, 14c of both chip-discharging flutes 14A, 14B, the bit body 10 exhibits an inflated H-shaped cross-section when viewed in a plane perpendicular to the axis O, as shown in FIG. 4. In addition, the cross-sectional shapes of both chip-discharging flutes 14A, 14B are asymmetrical to each other. Therefore, the cross-sectional shape of one 14A of the chip-discharging flutes, even when it is rotated about the axis O, does not exactly overlap the cross-section of the other 14B of the chip-discharging flutes.

Furthermore, the chip-discharging flutes 14A, 14B are so configured that the area $S_A$ of the cross-section of one 14A of the chip-discharging flutes as viewed in the plane perpendicular to the axis O is greater than the area $S_B$ of the other 14B of the chip-discharging flutes.

As stated before, the third inner surface portion 14c starts from a point which is slightly rearwardly spaced from the end of each chip-discharging flute 14A, 14B, so that the first inner surface portion 14a and the second inner surface portion 14b, at the front end of each chip-discharging flute 14A, 14B. In each of the chip-discharging flutes 14A, 14B, the starting end of the first inner surface portion 14a is stepped to form an insert mounting seat 15 which is recessed from the level of the first inner surface portion 14a so as to open in the end surface of the bit body.

Thus, there are two insert mounting seats 15. The insert mounting seat 15 formed in the end of the first inner surface portion 14a of one of the chip-discharging flutes 14A is located on the inner peripheral part of the bit body 10, i.e., closer to the axis O, so as to serve as an inner peripheral insert mounting seat 15A, whereas the insert mounting seat 15 formed in the end of the first inner surface portion 14a of the other chip-discharging flute 14B is disposed on the outer peripheral part of the bit body 10, thus serving as an outer peripheral insert mounting surface 15B.

Cutting inserts 16, which are adapted to be mounted on the insert mounting seats 15A, 15B, are made of a hard material such as a carbide alloy. As in the case of the known drills described before, each insert is a fiat tabular member having a substantially regular triangular form when viewed in plan from the same side as a rake surface 17 and a seating surface 18. A relief angle is given to a relief surface 19 provided on the periphery of the rake surface 17 and the seating surface 18. Thus, the insert 16 is a positive insert.

Straight cutting edge portions 20 are formed on the three side ridges of the above-mentioned rake surface 17. A pair of nose cutting edge portions 21, 21 are provided at each apex C of the triangle. More specifically, these nose cutting edge portions 21, 21 are symmetrical with each other with respect to the bisector line of the apex C and their extensions intersect each other at an angle which is greater than the angle formed between two sides of the triangle on both sides of this apex C, thus forming a V-like form of the apex C. An inter-nose rounded cutting edge portion 22 is formed between these nose cutting edge portions 21, 21. An inter-edge rounded cutting edge portion 23 is formed between each nose cutting edge portion 21 and the adjacent straight cutting edge portion 20.

The cutting inserts 16 having the described construction are mounted on the inner peripheral insert mounting portion 15A and the outer peripheral insert mounting portion 15B, respectively, and are fixed to the bit body 10 by means of clamp screws 24, such that the rake surface 17 of each insert is directed in the direction of rotation of the drill and such that one of the inter-edge rounded cutting edge portion 22 is projected in the direction of the axis O.

Figure 6:
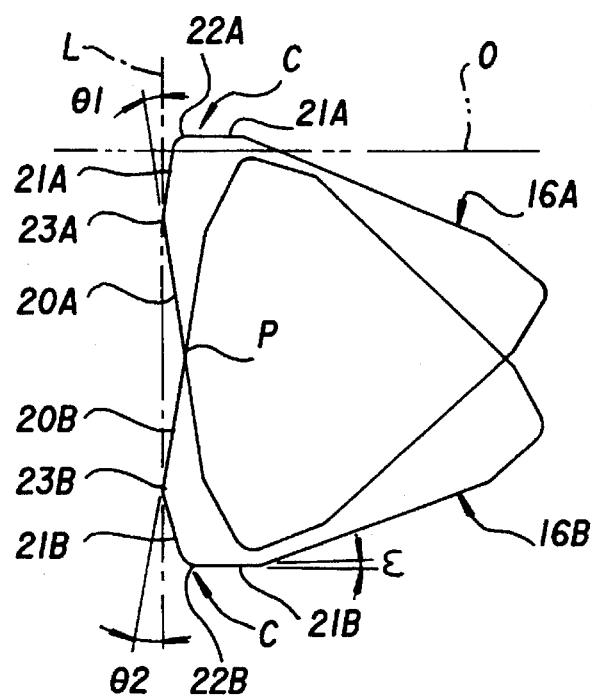
FIG. 6 is an illustration of loci of rotation of an inner peripheral cutting insert 16A and an outer peripheral cutting insert 16B in a plane perpendicular to the axis O.
Figure 21:
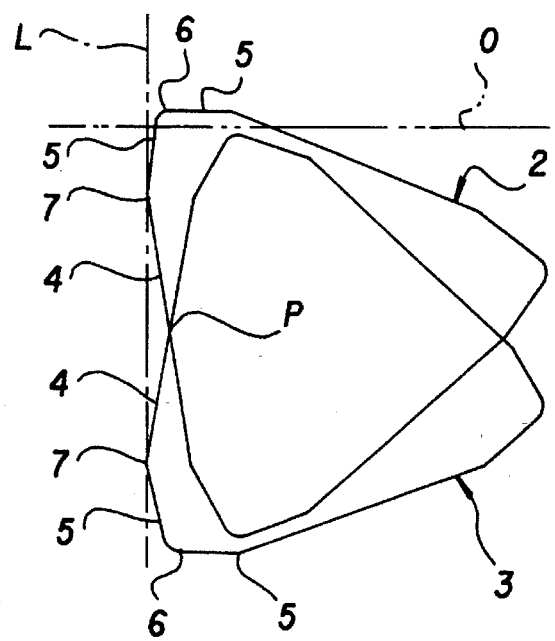
FIG. 21 is an illustration of loci of rotation of cutting inserts 2, 3 used in the known drill shown in FIG. 20 in a plane which contains the axis O.

FIG. 6 shows, similarly to FIG. 21, the loci of rotation of the cutting insert 16 (referred to as inner peripheral cutting insert 16A) mounted on the inner peripheral insert mounting seat 16A and the cutting insert 16 (referred to an outer peripheral cutting insert 16B) mounted on the outer peripheral insert mounting seat 16B, in a plane containing the axis O. In FIG. 6, a suffix "A" is added to numerals which indicate elements of the inner peripheral cutting insert 16A and a suffix "B" is added to elements of the outer peripheral cutting insert 16B.

As shown in FIG. 6, in the inner peripheral cutting insert 16A, a bottom cutting edge is constituted by one of the straight edges 20A and the nose cutting edge portion 21A connected to the radially inner end of this straight cutting edge portion 20A through the inter-edge rounded cutting edge portion 23A. In addition, the inner peripheral cutting insert 16A is so disposed that the inter-edge rounded cutting edge portion 23A mentioned above projects in the direction of the axis O forwardly (leftward as viewed in FIG. 6) beyond the above-mentioned nose cutting edge portion 21A and the straight cutting edge portion 20A which form the bottom cutting edge. Furthermore, the inner peripheral cutting insert 16A is so disposed that the inter-nose rounded cutting edge portion 22A adjacent to the nose cutting edge portion 21A of the bottom cutting edge projects radially inward beyond the axis O, thus providing a so-called over-center arrangement.

In the illustrated embodiment, the angle $\theta_1$ of 6° is formed between the straight cutting age portion 20A and an imaginary line L perendicular to the axis O and passing the extreme end of the above-mentioned inter-edge rounded cutting edge portion 23A.

Referring now to the outer peripheral cutting insert 16B, a bottom cutting edge is constituted by one of the straight edges 20B and the nose cutting edge portion 21B connected to the radially inner end of this straight cutting edge portion 20B through the inter-edge rounded cutting edge portion 23B. In addition, the outer peripheral cutting insert 16B is so disposed that the inter-edge rounded cutting age portion 23B mentioned above projects in the direction of the axis O forwardly beyond the above-mentioned nose cutting edge portion 21B and the straight cutting edge portion 20B which form the bottom cutting edge. The locus of rotation of the extreme end of the inter-edge rounded cutting edge portion substantially coincides with the above-mentioned imaginary line L.

This outer peripheral cutting insert 16B is so disposed that the outermost nose cutting edge portion 21B, which is connected through the inter-nose rounded cutting edge portion 22B to the nose cutting edge portion 21B of the bottom cutting edge, is inclined rearwardly and radially inwardly so as to progressively approach the axis O towards the read end (right end as viewed in FIG. 6), thus imparting a relief angle $\epsilon$ to the nose cutting edge portion 21B. Preferably, the relief angle $\epsilon$ of the nose cutting edge portion 21B is set to range between 2° and 28°. In this embodiment, the relief angle 8 is set to be 2°.

The arrangement is such that the angle $\theta_2$ formed between the above-mentioned imaginary line L and the straight cutting edge portion 20B of the outer peripheral cutting insert 16B is greater than the angle $\theta_1$ formed between the imaginary line L and the straight cutting edge portion 20A of the inner peripheral cutting insert 16A. In the illustrated embodiment, the angle $\theta_2$ is set to be 8°. Preferably, the angle $\theta_1$ and the angle $\theta_2$ are respectively determined to fall within the ranges of between 1° and 19° and between 2° and 20°, in such a manner as to meet the condition of $\theta_1<\theta_2$. In any event, it is important that both inter-edge rounded cutting edge portions 23A and 23B project forwardly in the direction of axis O beyond the straight cutting edge portions 20A and 20B, and both cutting edge portions 23A and 23B be tangential to the line L. This provides for stable cutting especially when the cutting edges first contact a workpiece.

In the described arrangement, the inner peripheral cutting insert 16A and the outer peripheral cutting insert 16B are disposed such that in the above-mentioned plane containing the axis O, the locus of rotation of the straight cutting edge portion 20A constituting the bottom cutting edge of the inner peripheral cutting insert 16A and the locus of the straight cutting edge portion 20B constituting the bottom cutting edge of the outer peripheral cutting insert 16B cross each other at a point P.

Figure 7:
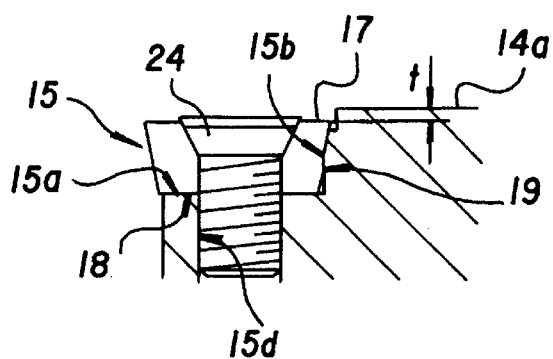
FIG. 7 is a sectional view of a cutting insert mounting seat 15.

FIG. 7 shows a section of the insert mounting seat 15 mounting the cutting insert 16. As will be seen from FIG. 7 with the assist of FIG. 1, the insert mounting seat 15 has a mounting bottom surface 15a which is closely contacted by the seating surface 18 of the cutting insert 16 and the mounting seat wall surfaces 15b which are independent from the bottom surface 15a and which are contactable with the relief surfaces 19 of the cutting insert. A recess 15c is formed in the regions where two adjacent mounting seat wall surfaces 15b, 15b cross each other, in order to avoid interference between the cutting insert mounting seat 15 and the relief surface portion 19 around the apex C of the cutting insert 16. In FIG. 7, a reference numeral 15d denotes a threaded hole for receiving the aforementioned clamping screw 24 for fixing the cutting insert 16. Preferably, a hardening surface treatment such as quenching is effected on the front end portion of the bit body 10.

Furthermore, in the illustrated embodiment, the first inner surface portion 14a is positioned at a level higher than that of the straight cutting edge portion 20 of the cutting insert 16 when the latter is mounted. The difference "t" in the level between the first inner surface portion 14a and the straight cutting edge portion 20 is preferably not greater than 0.3 mm. In the illustrated embodiment, the height difference "t" is set to 0.1 mm.

At the same time, one end of the aforementioned oil passage bore 12 opens in the end surface 10a of the bit body 10 at positions which are on the trailing sides of the openings of the respective chip-discharging flutes 14A, 14B as viewed in the direction of rotation, so as to provide discharge ports 12d, 12d for discharging the cutting oil.

The oil passage bore 12 is formed to extend from the rear end towards the tip end of the bit body 10. More specifically, the oil passage bore 12 extends from the opening 12a in the shank portion 11 along the axis O into the flange portion 13b where the aforementioned radial holes 12b merge in the oil passage bore 12. The oil passage bore 12 then shunts into two branches 12e, 12e which linearly extend through lands 10b, 10b formed between two chip-discharging flutes 14A, 14B so as to be twisted relative to each other with respect to the axis O in accordance with the twist of the chip-discharging flutes 14A, 14B. The bore branches 12e, 12e finally open in the end surface 10a of the bit body 10, at the discharge ports 12d, 12d. Thus, in the front portion of the bit body 10 which extends forwardly from the flange 13, the branches 12e, 12e of the oil passage bore do not pass through a core portion near the axis O but extend through regions which are radially spaced from the axis O.

In addition, in the invention of this application, a plurality of grooves 25,25., are formed in the inner surface of each of the chip-discharging flutes 14A, 14B, so as to extend in the direction of the flute, i.e., in the chip-discharging direction. In the illustrated embodiment, the grooves 25, 25 . . . are formed only in the third inner surface portion 14c of each of the chip-discharging flutes 14A, 14B in two groups each containing three grooves, one of the groups is disposed on the portion of the third inner surface portion 14c adjacent to the first inner surface portion 14a while the other is provided on the portion of the third inner surface portion 14c adjacent to the second inner surface portion 14b, thus six grooves in total are formed in each flute, as shown in FIG. 4.

In this embodiment, the grooves 25, 25 of one group are formed to exhibit a wave-like or corrugated cross-section formed by consecutive and alternate semicircular recess and semicircular protrusion. The groove, however, may have another cross-sectional shape such as triangle or rectangle. It is, however, preferred that the ridge between adjacent grooves 25, 25 have a cross-section which is rounded at a sufficiently large radius of curvature.

In use of this drill, the bit body 10 is fixed at its shank 11 to the end of, for example, the spindle of a machine tool. The bit body is rotated about the axis O while being forwardly fed in the direction of the axis O, thereby enabling the cutting edge portions 20, 21 of the cutting inserts 16 to cut into an object to form a bore.

The drill of the described embodiment has a flange 13 on the bit body 10, and the bit body 10 is held by a holding portion H of the machine tool with the annular end surface 13c of the flange 13 contacting the front end surface of the holding portion H over the entire area of the annular surface 13a. It is therefore possible to increase the area of contact of the bit body 10 with the holding portion H, thus attaining a higher rigidity of the mount of the drill. Consequently, the bit body 10 is rigidly and firmly held by the holding portion H, thus remarkably suppressing vibration and shiver of the drill 10 during boring operation.

Therefore, the drilling operation can be conducted with a high degree of stability, thus contributing to improvements in the machining precision and the machined surface quality, even when the drill is of the type which is liable to generate vibration or shiver, e.g., the drills in which cutting inserts 16A, 16B are mounted with offsets to radially outer and inner sides to receive different levels of resistance or cutting force as in the described embodiment or the described known throw-away, or the drills having large values of L/D ratio.

In the illustrated embodiments, the outside diameter E of the annular surface 13c of the flange 13 is determined to range between 1.1×D and 3.0×D, with D representing the outside diameter of the bottom cutting edge. This is because any value of the diameter E below 1.1×D does not provide sufficient increase in the area of contact between the bit body 10 and the holding portion H, failing to provide the expected rigidity of the mount of the bit body 10, and because any value of the diameter E exceeding 3.0×D does not provide increase of the contact area since the area of the end surface of the holding portion H is determined by the design of the machine tool. Rather, such a large diameter hampers the handling of the drill.

FIG. 2 illustrates a preferred arrangement for mounting a drill of the present invention to a machine tool holding portion. With reference to FIG. 2, the shank 11 is formed with a conical depression or cavity 11c on the surface 11a which is contacted by a fixing screw HT. The center axis $A_s$, of the screw HT is offset rearwardly of the center axis $A_d$ of the conical cavity 11c so as to urge the shank 11 and flange portion 13b rearwardly and increase a contacting force $F_b$, between the end surface 13c and cylindrical holding portion H of the machine tool; such as, for example, a spindle of a lathe.

As stated before, in the drill of the type in which the cutting insert 16A, 16B forming the bottom cutting edge are disposed with radially inward and outward offsets, both cutting inserts 16A, 16B receive different levels of resistance or cutting force, thus causing a radial imbalance of the force applied to the bit body 10.

This radial imbalance of force, however, can be eliminated in the described embodiment by virtue of the fact that the angle $\theta_2$ formed between the imaginary line L perpendicular to the axis O and the straight cutting edge portion 20B of the outer peripheral cutting insert 16B is determined to be greater than the angle $\theta_1$ formed between the imaginary line L perpendicular to the axis O and the straight cutting edge portion 20A of the inner peripheral cutting insert 16A.

More specifically, according to such an arrangement, the transverse cutting edge angle given to the straight cutting edge portion 20B of the outer peripheral cutting insert 16B is greater than that given to the straight cutting edge portion 20A of the inner peripheral cutting insert 16A. Therefore, variation in the cutting force applied to the straight cutting edge portion 20A of the inner peripheral cutting insert 16A, which inherently receives smaller cutting force than the outer peripheral cutting insert 16B, is effectively suppressed and, at the same time, the cutting force applied to the outer peripheral cutting insert 16B, which is inherently subjected to a greater cutting force than the inner peripheral cutting edge 16A, can be effectively reduced.

Thus, the described embodiment makes it possible to obtain a good balance between the cutting force applied to the inner peripheral cutting insert 16A and the cutting force applied to the outer peripheral cutting insert 16B, while reducing the total cutting force acting on the whole bottom cutting edge. Consequently, any radial force acting on the bit body 10 during the drilling can effectively be cancelled, whereby vibration and shiver of the bit body 10 attributable to radial force imbalance can be suppressed. This effect, in combination with the enhancement of the mounting rigidity of the bit body 10 offered by the flange 13, provides a higher degree of stability of the machining.

In the described embodiment, the angle $\theta_1$ formed between the straight cutting edge portion 20A of the inner peripheral cutting insert 16A and the imaginary line L is set to be 6°, while the angle $\theta_2$ formed between the straight cutting edge portion 20B of the outer peripheral cutting insert 16B and the imaginary straight line L is set to be 8°. This, however, is not exclusive and the angles $\theta_1$ and $\theta_2$ are preferably determined to fall within the ranges of from 1° to 19° and from 2° to 20°, respectively, while meeting the condition of $\theta_1 < \theta_2$.

When the angles $\theta_1$ and $\theta_2$ are too small, the loci of rotation of the straight cutting edge portions 20A, 20B which form the bottom cutting edge approaches the above-mentioned straight line L, with the result that the axial component of the cutting force acting on the straight cutting edge portions 20A, 20B is increased to excessively force the bit body 10 in the axial direction. Conversely, too large angles $\theta_1$, $\theta_2$ excessively increase the circumferential component of the cutting force acting on the straight cutting edge portions 20A, 20B, with the result that the power for driving the drill is increased.

Moreover, as previously mentioned, it is important that both inter-edge rounded cutting edge portions 23A and 23B project forwardly in the direction of axis O beyond the straight cutting edge portions 20A and 20B, and both cutting edge portions 23A and 23B be tangential to the line L. This configuration locates the cutting edges 23A and 23B in positions to bite into a designated location on a workpiece and provides for an accurate and stable cutting operation when the cutting inserts first contact the workpiece.

During machining conducted by a drill of the kind described, the object material is cut by the bottom cutting edges constituted by the straight cutting edge portions 20 and the nose cutting edge portions 21, so that chips of the material are continuously generated. Such chips are conveyed through the chip-discharging flutes 14A, 14B so as to be discharged from the rear ends of these flutes. At the same time, a suitable cutting oil is supplied as a coolant into the cutting region through the oil passage bore 12. The cutting oil supplied to the cutting region then flows rearward along through the chip-discharging flutes 14 along the axis O towards the rear end together with the chips of the cut material. The cutting oil serves to forcibly convey the chips so as to promote the discharge of the chips.

In the described embodiment, each of the chip-discharging flutes 14A, 14B has the first inner surface portion 14a which is directed in the direction of rotation of the drill, the second inner surface portion 14b which is directed counter to the direction of rotation and the third inner surface portion 14c which is recessed from the first and second inner surface portions 14a, 14b. Each of the dust-discharging flutes 14A, 14B, therefore, can have a sufficiently large cross-sectional area in the plane perpendicular to the axis O. Thus, the discharging capacity of the chip-discharging flutes 14A, 14B can be increased by the provision of the third inner surface portions 14c, thereby offering a greater rate of discharge and smoother disposal of the chips.

Furthermore, in the described embodiment, obtuse angles $\beta_{A1}$, $\beta_{A2}$, $\beta_{B1}$, $\beta_{B2}$ are formed between the third inner surface portions 14c and the first and second inner surface portions 14a, 14b in both chip-discharging flutes 14A, 14B, so as to ensure that chips can be smoothly introduced onto the third inner surface portion 14c along the first and second inner surface portions 14a, 14b. Consequently, the chips can be introduced onto and discharged long the third inner surface portions 14c in both chip-discharging flutes without delay.

Furthermore, the third inner surface portion 14c is curved and recessed radially inward of the bit body 10 so as to exhibit a substantially arcuate cross-section in the plane perpendicular to the axis O. Consequently, no restriction which would cause clog or stagnation of the chips exist in both chip-discharging flutes 14A, 14B, whereby a further smooth discharge of the chips is ensured.

In a drill of the type which has bottom cutting edges mounted at radially inner and outer offsets on the bit body 10, as in the described embodiment or known drills mentioned before, there is a difference between the rate of cutting performed by the radially inner straight cutting edge portion 20A and that performed by the radially outer straight cutting edge portion 20B, although the amount of difference depends on the position of the point P where the loci of rotation of these cutting edge portions 20A and 20B intersect each other. More specifically, the inner peripheral cutting edge portions 20A, 21A provide a greater rate of cutting than the outer peripheral cutting edge portions 20B, 21B.

In view of this problem, the width $W_A$ of the chip-discharging flute 14A leading from the inner peripheral cutting edge portions 20A, 21A is determined to be greater than that $W_B$ of the chip-discharging flute 14B leading from the outer peripheral cutting edge portions 20B, 21B. In addition, the distance $d_A$ between the axis O and the center $X_A$ of the arc of the third inner surface portion 14c of the chip-discharging flute 14A in a cross-section perpendicular to the axis O is smaller than the distance $d_B$ between the axis O and the center $X_B$ of the arc of the third inner surface portion 14c of the chip-discharging flute 14B. Consequently, the cross-sectional shapes of the chip-discharging flutes 14A, 14B are asymmetrical with each other with respect to the axis O, and the cross-sectional area $S_A$ of the chip-discharging flute 14A leading from the radially inner cutting edge portions 20A, 21B is greater than the cross-sectional area $S_B$ of the chip-discharging flute 14B leading from the radially inner cutting edge portions 20A, 21B is greater than the cross-sectional area $S_B$ of the chip-discharging flute 14B leading from the radially outer cutting edge portions 20B, 21B. Consequently, the chip-discharging flute 14A which receives the chips at a greater rate can have a greater chip discharging capacity, thus preventing clog or stagnation of the chips in this chip-discharging flute 14A.

Chip-discharging capacities would be enhanced if the cross-sectional areas $S_A$ and $S_B$ of both chip-discharging flutes 14A, 14B were increased. However, such increase in the cross-sectional areas of the chip-discharging flutes naturally reduces the cross-sectional area of the solid portion of the bit body 10, which inevitably leads to a reduction in the rigidity of the bit body, with the result that vibration and shiver of the drill are enhanced.

In the described embodiment, however, the cross-sectional shapes of both chip-discharging flutes 14A, 14B are determined to be asymmetrical with each other, and the cross-sectional area $S_A$ of one 14A of the chip-discharging flutes which receives a greater rate of chips is determined to be greater than the cross-sectional area $S_B$ of the other 14B chip-discharging flute, thus minimizing the reduction in the cross-sectional area of the solid portion of the bit body 10.

The inner surface of the chip-discharging flutes 14A, 14B are so configured that the third inner surface portion 14c interconnects the first and second inner surface portions 14a, 14b which converge such that radially inward extensions thereof intersect each other. This makes it possible to preserve a comparatively large wall thickness in the outer peripheral region of the land portion 10b, i.e., in the portion between the first inner surface portion 14a of the chip-discharging flute 14A and the second inner surface portion 14b of the chip-discharging flute 14B and the portion between the first inner surface portion 14a of the chip-discharging flute 14B and the second inner surface portion 14b of the chip-discharging flute 14A.

It is therefore possible to minimize any reduction in the moment of inertia of area despite a reduction in the cross-sectional area of said portion of the bit body 10 due to increase in the cross-sectional areas of the chip-discharging flutes 14A, 14B. Consequently, the bit body 10 can have a sufficiently large rigidity which, in combination with the asymmetric cross-sectional shapes of the chip-discharging flutes 14A, 14B, effectively promotes the discharge of the chips while suppressing vibration and shiver of the bit body 10.

Furthermore, in the described embodiment, a plurality of grooves 25, 25 are formed in the third inner surface 14c of each of the chip-discharging flutes 14A, 14B. These grooves 25, 25 effectively reduce the area of contact between the third inner surface portion 14c and the chips flowing along this surface and, hence, the friction acting therebetween. Consequently, clog or stagnation of the chips due to friction can be avoided to ensure smoother discharge of the chips.

In order to minimize the friction due to contact between the chips and the chip-discharging flute 14, it is desirable that the grooves 25, 25 are formed in all of the inner surface portions 14a, 14b and 14c, preferably over the entire widthwise regions of these surface portions. An appreciable effect of reducing friction, however, is attained even when the grooves 25, 25 are formed only in the third inner surface portion 14c at local portions of this surface portion, as in the case of the described embodiment. In the illustrated embodiment, the third inner surface portion 14c extends only over a limited region of the chip-discharging flute 14 between a point near the rear end of the insert mounting seat 15 and the front end of the flange 13. This means that the grooves 25, 25 do not extend over the entire length of the chip-discharging flute. This, however, is only illustrative and the grooves 25, 25 may extend from the front end of the chip-discharging flute 14 or down to the rear end of the chip-discharging flute 14 merging in the peripheral surface of the bit body, when these grooves 25, 25 are formed also in the first and second inner surface portions 14a, 14b.

Furthermore, in the illustrated embodiment, the first inner surface portion 14a of the chip-discharging flute 14 is held at a level which is higher than the cutting edge portions 20, 21 by a small mount "t", when the cutting insert is mounted on the bit body 10. That is to say, the cutting edge portions 20, 21 do never project beyond the level of the first inner surface portion 14a at the mounting seat surface 15b of the insert mounting seat 15. It is therefore possible to prevent breakdown of the cutting edge portions 20, 21 which may otherwise occur when the chips of the cut material move from the rake surface 17 of the cutting insert onto the first inner surface portion 14a of the chip-discharging flute. In addition, since the relief surface 19 of the cutting insert never projects beyond the first inner surface portion 14a, trapping of the chips into the gap between the relief surface 19 and the first inner surface portion 14a can advantageously be avoided.

The above-mentioned level difference "t" between the cutting edge portion 20 and the first inner surface portion 14a, however, is preferably set to be O.3 mm or less, because a too large value of the level different "t" causes breakage or wear of the step portion formed between the cutting edge portion 20 and the first inner surface portion 14a, due to collision with the chips of the cut material.

As stated before, in order to attain smooth discharge of the chips of the cut material, it is necessary to provide sufficiently large discharging capacity of the chip-discharging flutes 14A, 14B, while efficiently supplying a cutting oil so as to forcibly convey the chips which have been introduced into the chip-discharging flutes 14A, 14B. In the described embodiment, the cutting oil is supplied through the oil passage bore 12 extending forwardly from the rear end of the bit body 10 and is discharged through the discharge ports 12d, 12d communicating with the oil passage bore 12 and opening in the end of the drill, so as to be efficiently supplied to the region where the cutting is being conducted.

In a drill having twisted chip-discharging flutes 14A, 14B as in the described embodiment, the lands 10b, 10b left between these chip-discharging flutes 14A, 14B also are twisted. It is extremely difficult to form a twisted oil passage bore in conformity with the twist of these lands. In general, therefore, an axial oil passage bore such as that designated 12 in the embodiment is linearly formed through the core portion F of the bit body 10. The passage bore 12 then branches into two passages leading to the discharge ports 12d, 12d which open in the end surface 10a of the bit body.

In the described embodiment, however, the thickness of the core portion of the bit body is inevitably reduced because the chip-discharging flutes 14A, 14b have third inner surface portions 14c which are arcuately recessed from the first and second inner surface portions 14a, 14b. Therefore, the oil passage bore 12, when formed through the core portion F, is required to have a small diameter 12. This makes it difficult to supply the cutting oil at a sufficiently large rate.

In order to obviate this problem, in the illustrated embodiment, the angle α of twist of each chip-discharging flute 14 from the front to the rear ends about the axis O may range up to 9O°, and linear oil passage bores 12e, 12e are formed in the lands 10b, 10b between both chip-discharging flutes 14A, 14B, at an inclination with respect to the axis O in accordance with the twist of the chip-discharging flutes 14A, 14B, thereby overcoming the above-described problem.

In other words, in the described embodiment, when the angle α of twist of the chip-discharging flutes 14A, 14B about the axis O is set to a comparatively small value in the range of up to 9O°, the angle of twist of the lands 10b, 10b is correspondingly small. It is therefore possible to form straight or linear oil passage bores 12e, 12e despite the presence of the twisted chip-discharging flute 14A, 14B, by setting these oil passage bores 12e, 12e at an inclination corresponding to the twist of the lands 10b, 10b, i.e., the twist of the chip-discharging flutes 14A, 14B. Furthermore, the oil passage bores 12e, 12e thus formed can have comparatively large diameters because the lands 10b, 10b have a sufficiently large radial wall thickness. Consequently, a large rate of supply of the cutting oil is obtained to ensure greater cooling and lubricating effects, thus attaining further improvement in the chip discharging performance.

In the described embodiment, the cutting oil is supplied through the oil passage bore 12 formed in the bit body 10. This, however, is only illustrative. Namely, by virtue of the large cross-sectional areas of the chip-discharging flutes 14A, 14B, cutting oil can be supplied at a sufficiently large rate externally along the chip-discharging flutes 14A, 14B, rather than along the internal oil passage bore 12.

It is therefore possible to supply the cutting region with the cutting oil with a sufficiently large rate, even when the drill is used on a machine tool which does not have means for feeding the oil into the oil passage bore 12 in the bit body 10, thus ensuring that the machining is conducted stably under sufficient supply of the cutting oil. The drill of the described embodiment is therefore usable also on machine tools having no cutting oil supply system connectable to the internal oil passage bore, thus enhancing the adaptability to a variety of types of machine tools.

As stated above, the drill of the invention is attached to the end of the spindle of a machine tool such as a machining center, so as to be rotationally driven about the axis O, thus functioning as a so-called "turning tool". In such uses, the twisting of the chip-discharging flutes 14A, 14B advantageously promotes the discharge of the chips of the cut material.

In recent years, a drilling method has become popular in which a drill is fixed to a tool rest or the like of a lathe in a posture as shown in FIG. 2, and the material to be drilled is turned against the stationary drill. When such a machining method is adopted, in order to obtain sufficient rigidity of the drill, the chip-discharging flutes preferably extend straight in parallel with the axis O.

In the illustrated embodiment, the angle α of twist of the chip-discharging flutes 14A, 14B about the axis O is set to a small value falling within the range specified above. Therefore, the twisted chip-discharging flutes 14A, 14B of the drill in accordance with the invention can provide satisfactory chip-discharging performance when the drill is used as an ordinary turning tool. In addition, rigidity of the drill in accordance with the invention can also be exhibited when the drill is used as the turning tool. Thus, the drill of the described embodiment finds a further spreading use. When the drill of this embodiment is used by being stationarily fixed to a lathe or the like, the supply of the cutting oil into the oil passage bore 12 is conducted through the radial holes 12b from the openings 12c which open in the peripheral surface of the flange portion 13b of the flange 13.

Figure 8:
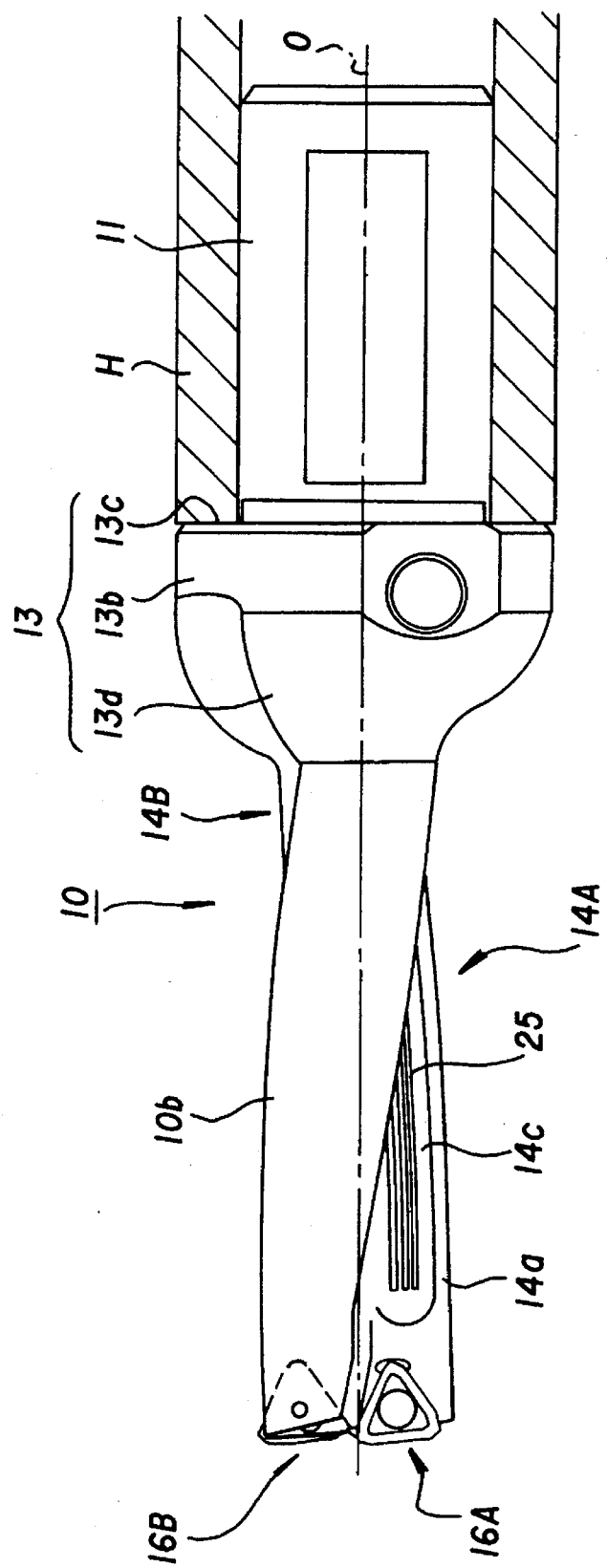
FIG. 8 is a side elevational view of another embodiment of the present invention.

In the described embodiment, the converging portion 13a of the flange 13 has frusto-conical form which reduces its diameter linearly at a constant rate along the length. However, the converging portion 13a may have such a form that, as shown in FIG. 8, the rate of decrease in the radius is progressively increased along the axis O towards the tip end of the bit body 10 so as to provide a convexed or semicircular profile of the converging portion 13a when viewed in side elevation. Such a configuration of the bit body further enhances the rigidity of the drill over the embodiment shown in FIGS. 1 to 7, thereby effectively reducing the vibration and shiver of the bit body.

Figure 9:
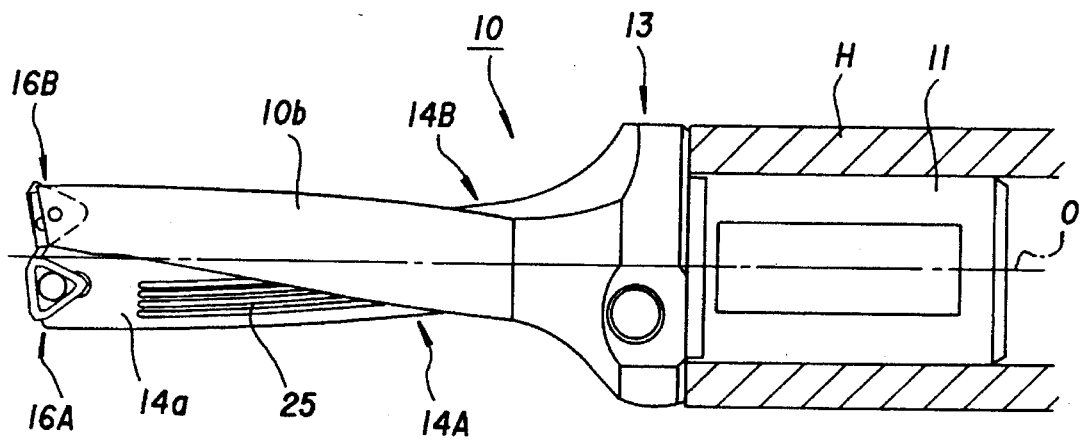
FIG. 9 is a side elevational view of still another embodiment of the present invention.
Figure 10:
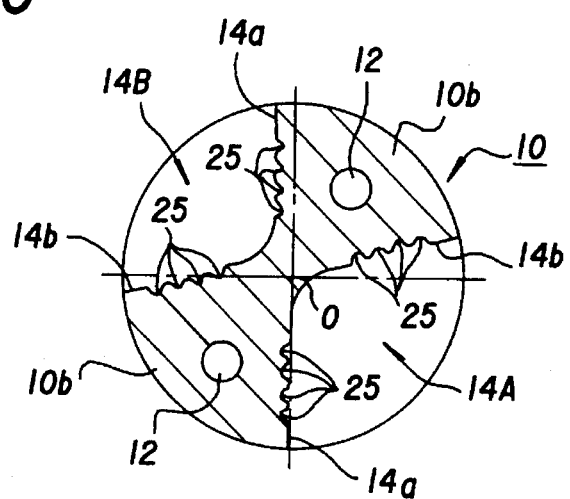
FIG. 10 is a sectional view of the embodiment shown in FIG. 9 taken along a plane perpendicular to the axis O.
Figure 11:
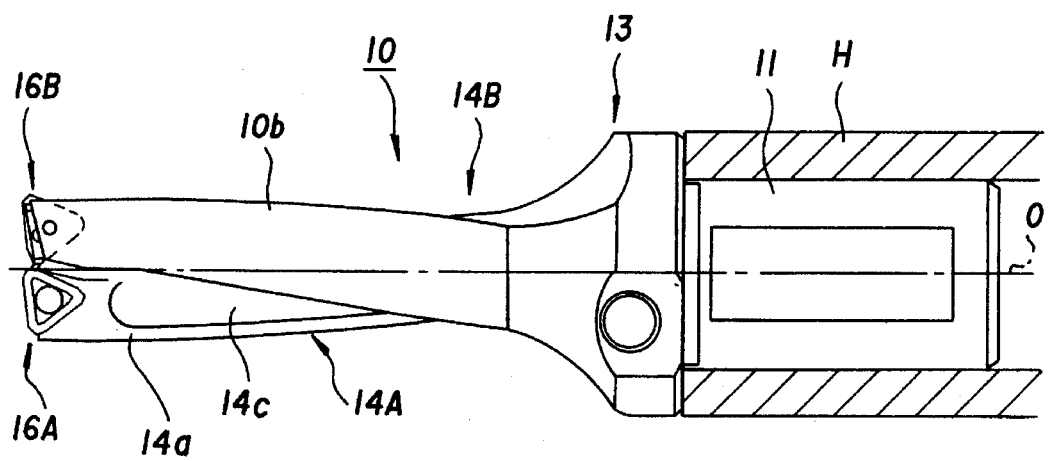
FIG. 11 is a side elevational view of a further embodiment of the present invention.
Figure 12:
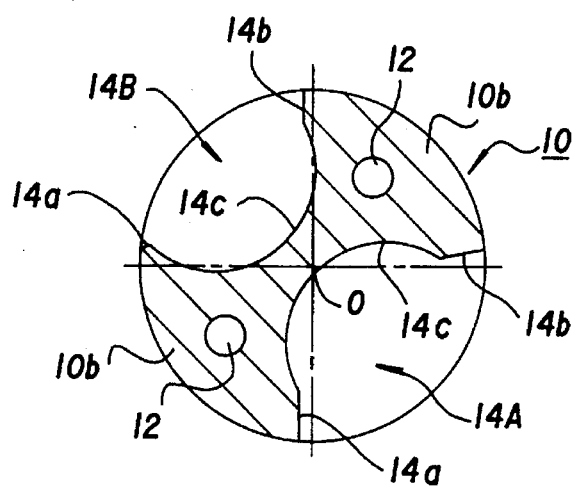
FIG. 12 is a sectional view of the embodiment shown in FIG. 11 taken along a plane perpendicular to the axis O.

In the described embodiment, the inner surface of each of the chip-discharging flutes 14A, 14B is constituted by first and second inner surface portions 14a, 14b and the third inner surface portion 14c which is recessed from the first and second inner surface portions 14a, 14b and which is provided with a plurality of grooves 25, 25. This arrangement, however, is not essential and the present invention does not exclude a drill in which the inner surface of each chip-discharging flute is composed only of the first and second inner surfaces 14a and 14b as shown in FIG. 9 and 10 or the flute inner surface is devoid of grooves 25, 25 as shown in FIGS. 11 and 12.

Figure 13:
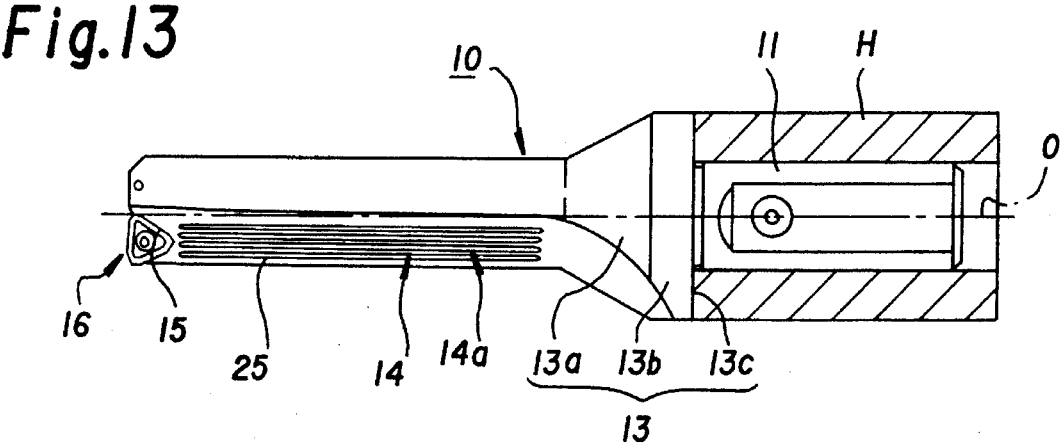
FIG. 13 is a side elevational view of a further embodiment of the present invention.
Figure 14:
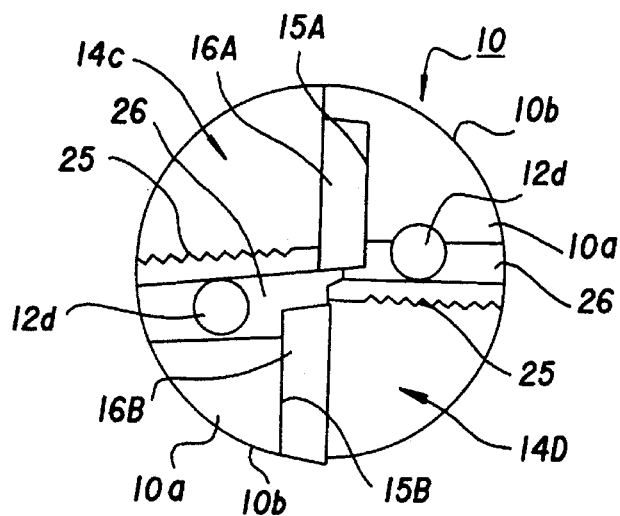
FIG. 14 is a front elevational view of the embodiment shown in FIG. 13 as viewed from the front side.

In the embodiments described hereinbefore, the chip-discharging grooves 14A, 14B are formed with a twist about the axis O. This, however, is only illustrative. For instance, an embodiment shown in FIGS. 13 to 15 has chip-discharging flutes 14C, 14D which extend straight in parallel with the axis O.

Figure 15:
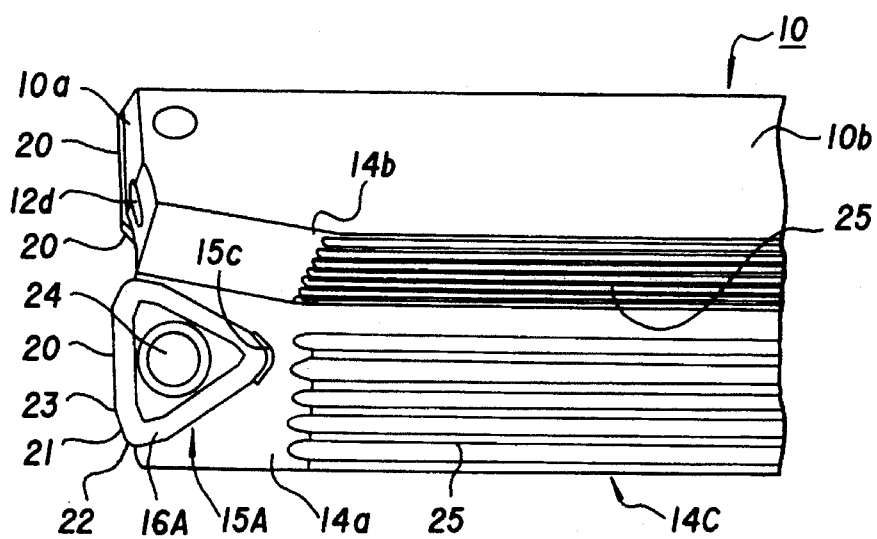
FIG. 15 is an enlarged side elevational view of a front end portion of the embodiment shown in FIG. 13.

In this embodiment, recesses 26 are formed in the end surface 10a of the bit body 10 along the trailing edges (as viewed in the direction of rotation) of the openings of the respective chip-discharging flutes 14, and the discharge ports or openings 12d leading from the oil passage bore 12 are opened in the bottoms of these recesses 26 so as to communicate with the chip-discharging flutes 14 through these recesses 26. In addition, the bottom of each recess 26 is arcuately recessed rearwardly as shown in FIG. 15 as viewed in the direction of the above-mentioned edge, thereby attaining a large holding capacity. According to this arrangement, the cutting oil discharged from the discharge opening 12d is effectively spread over the entire width of the chip-discharging flute through the recess 26 so as to flow along the chip-discharging flute 14 in contact with the entire inner surface of the chip-discharging flute 14. Consequently, the chips in the chip-discharging flute 14 can efficiently be discharged without stagnating in the flute. In addition, the cutting oil which is widely spread into the grooves 25, 25 can further reduce the friction between the chips and the inner surface of the chip-discharging flute.

Figure 16:
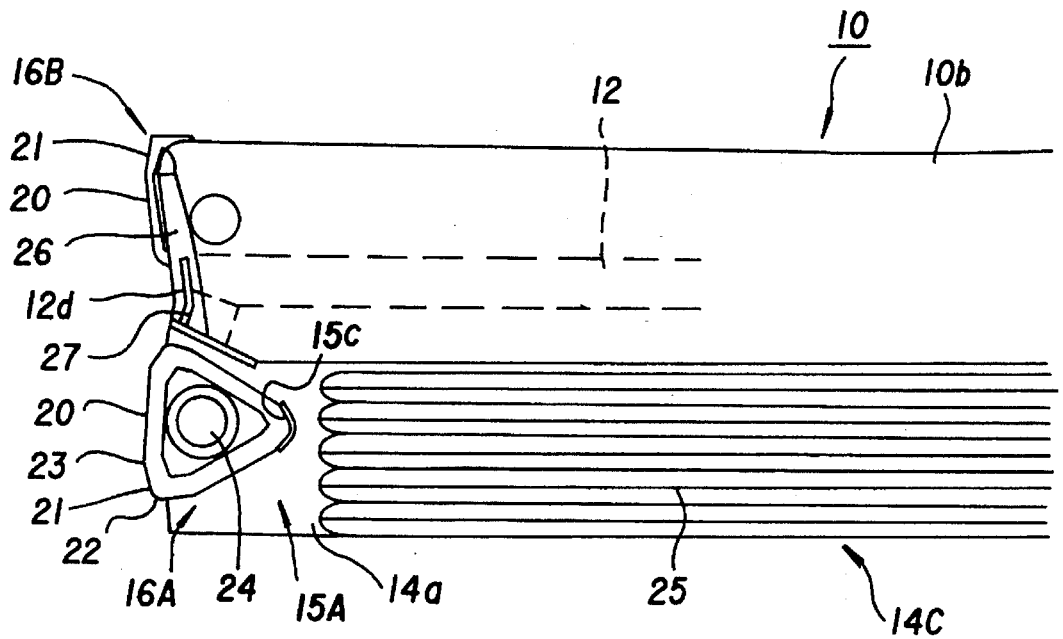
FIG. 16 is a side elevational view of a still further embodiment of the present invention.
Figure 17:
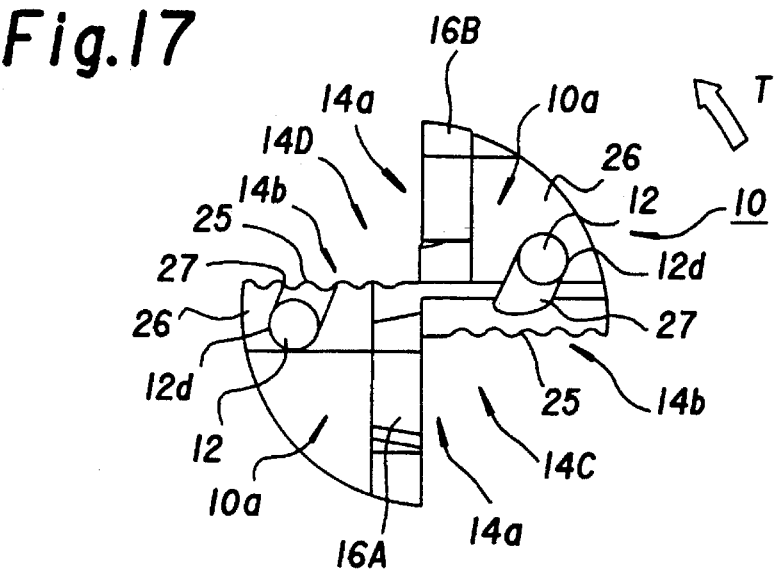
FIG. 17 is front elevational view of the embodiment shown in FIG. 16 as viewed from the front side.

In order to promote the flow of the cutting oil from the discharge opening 12d into the chip-discharging flute 14, a recess or channel 27 may be formed in the end surface 10a of the bit body 10 so as to provide a direct communication between the discharge opening 12d and the chip-discharging flute 14 as shown in FIGS. 16 and 17, in addition to the above-mentioned recess 26. Such a recess or channel 27 ensures a stable supply of the cutting oil into the chip-discharging flute 14, while increasing the rate of supply.

As illustrated, the recess or channel 27 is shaped so as to progressively approach the center of the bit body 10 towards the trailing end as viewed in the direction of rotation, thereby enabling the cutting oil to be supplied to the region near the cutting edge portion 20 of each cutting insert 16. It is therefore possible to concentrate the cutting oil to the region where the cutting is being conducted by the cutting edge portion 20, thereby effectively cooling the material and the cutting edge portion in the cutting region. However, it is not always necessary that both the recess 26 and the recess or channel 27 are formed; namely, one of the recess 26 and the recess or channel 27 may be omitted.

Figure 18:
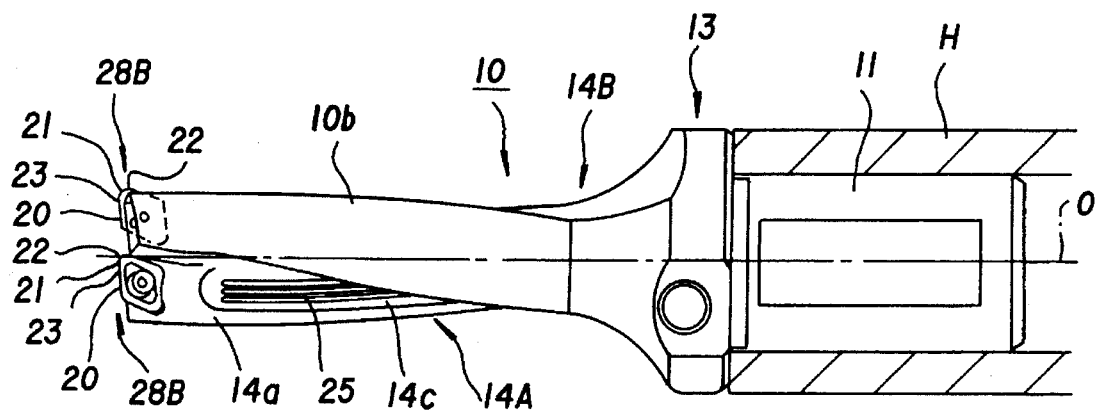
FIG. 18 is a side elevational view of a still further embodiment of the present invention.

The invention has been described through illustration of embodiments which employ cutting inserts 16 which have substantially regular triangular shapes. The invention, however, is not limited to such a type of throw-away cutting insert. For instance, it is possible to use diamond-shaped cutting inserts as an inner peripheral cutting insert 28A and an outer peripheral cutting insert 28B, as in an embodiment shown in FIG. 18. It is also possible to use three or more cutting inserts.

Figure 19:
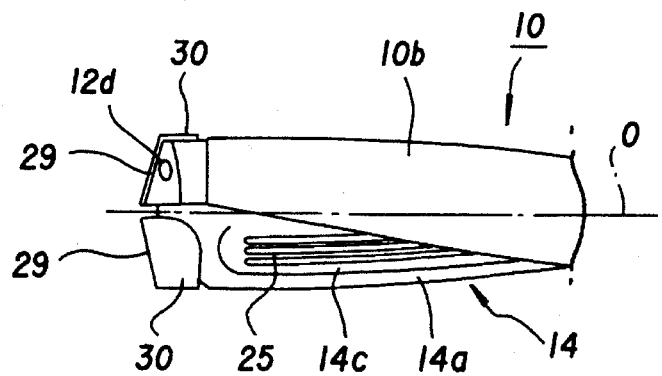
FIG. 19 is a side elevational view of the front end portion of a still further embodiment of the present invention.
Figure 20:
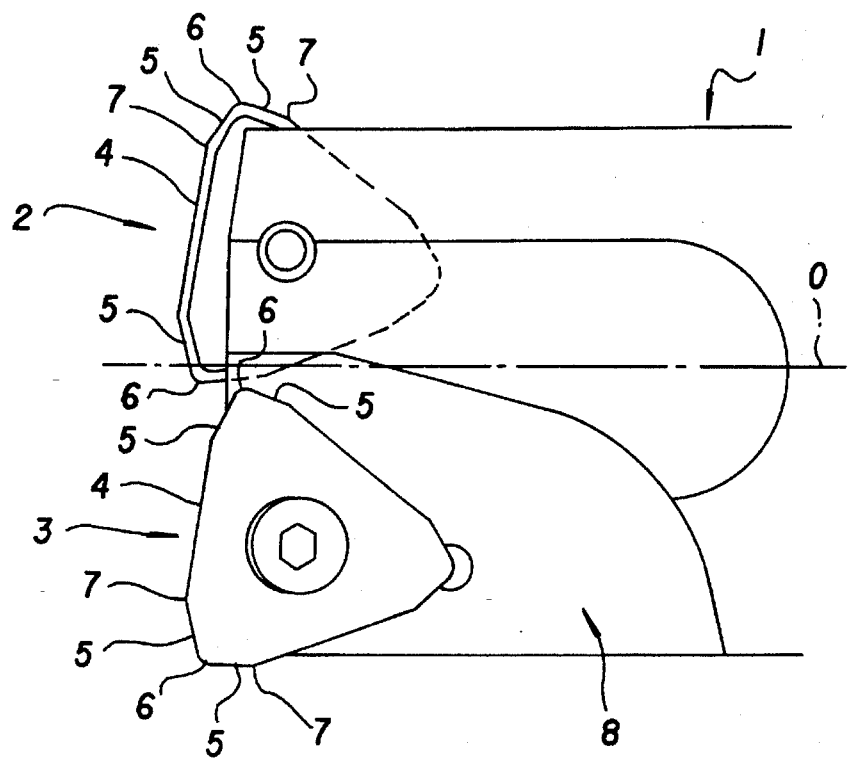
FIG. 20 is a side elevational view of the front end portion of a known drill.

Furthermore, the present invention is not limited to a drill of the type which employs throw-away cutting inserts having cutting edge portions constituting the bottom cutting edge. For instance, as shown in FIG. 19, the drill of the present invention may have a cutting edge tip 30 which has a cutting edge portion 29 constituting the bottom cutting edge and which is fixed by brazing to the bit body 10. It is also possible to suitably combine the features of the embodiments described hereinbefore.

As will be understood from the foregoing description, according to the present invention, the annular surface of the flange formed on the bit body is contactable with the front end surface of the machine tool over the entire area thereof. The drill, therefore, can be stably held by the holding portion by making contact therewith over an increased area of contact, thus exhibiting a more rigid mounting. Consequently, the vibration and shiver of the bit body during drilling can be greatly suppressed, so that high degree of machining precision and high quality of the machined surface can be obtained even when the drill used has cutting inserts which are offset radially inward and outward or even when a drill having a large value of the L/D ratio for forming a small-diameter long bore is used.

Although specific embodiments of the invention have been disclosed, the present invention is not to be construed as limited to the particular embodiments and forms disclosed herein since the foregoing description is to be regarded as illustrative rather than restrictive, and it should be understood that modifications and variations in details of construction may be made without departing from the spirit and scope of the invention as defined by the claims appended hereto.

What is claimed:

1. A drill, comprising:

a substantially cylindrical bit body;

a pair of chip discharging flutes with different depths, as measured from an outer diameter of said bit body to a bottom of the chip-discharging flute, formed in the outer peripheral surface of said body so as to open in the front end surface of said bit body and to extend rearward therefrom along and at both sides of an axis of said bit body;

a plurality of cutting members each having substantially the same size cutting edge portions constituting a bottom cutting edge;

said bit body having a flange portion which includes a substantially disk shaped flange connected to a converging portion, the diameter of said converging portion progressively decreases along said axis towards the front end of said bit body; and said substantially disk-shaped flange having a rearwardly facing annular end surface, said annular end surface being formed to contact a front end surface of a drill holding portion of a machine which rotatably holds said bit body substantially over the entire area of said annular end surface.

2. A drill, comprising:

a substantially cylindrical bit body;

a pair of chip discharging flutes formed in the outer peripheral surface of said body so as to open in the front end surface of said bit body and to extend rearward therefrom along and at both sides of an axis of said bit body;

cutting members having cutting edge portions constituting a bottom cutting edge;

said bit body having a flange portion which includes a substantially disk-shaped flange connected to a converging portion, wherein said converging portion is configured so that the rate of reduction in the radius is progressively increased along said axis toward the front end of said bit body; and said substantially disk-shaped flange has a rearwardly facing annular end surface, said annular end surface being formed to contact a front end surface of a drill holding portion of a machine which rotatably holds said bit body substantially over the entire area of said annular end surface.

3. A drill according to claim 1 or 2, wherein a plurality of grooves are formed in the inner surface of said chip-discharging flutes so as extend along parallel to each of said chip-discharging flutes.

4. A drill according to claim 1 or 2, wherein said chip-discharging flutes are helically twisted about said axis.

5. A drill according to claim 4, wherein the angle of twist of said chip-discharging flutes over the entire length of said chip-discharging grooves is less than 90°.

6. A drill according to claim 4, wherein cutting oil passage bores are formed in the lands defined between said chip-discharging flutes at a front end portion of said bit body, said cutting oil passage bores extending linearly at an inclination with respect to said axis in accordance with the twist of said chip-discharging flutes.

7. A drill according to claim 1 or 2, wherein said chip-discharging flutes extend straight along and parallel with said axis.

8. A drill according to claim 1 or 2, wherein said inner surface of said chip-discharging flutes has a first inner surface portion which is directed in the direction of rotation of said drill and a second inner surface portion which is directed in the counter direction at an inclination with respect to said first inner surface portion.

9. A drill according claim 8, wherein the inner surface of said chip-discharging flute has a third inner surface portion interconnecting said first and second inner surface portions and recessed from said first and second inner surface portions.

10. A drill according to claim 9, wherein angles of intersection between said first and third inner surface portions and between said second and third inner surface portions are obtuse.

11. A drill according to claim 9 wherein said third inner surface portion is arcuately recessed radially inwardly of said bit body.

12. A drill, comprising:

a substantially cylindrical bit body;

a pair of chip discharging flutes formed in the outer peripheral surface of said body so as to open in the front end surface of said bit body and to extend rearward therefrom along and at both sides of an axis of said bit body;

said chip-discharging flutes having an inner surface which has (a) a first inner surface portion which is directed in the direction of rotation of said drill, (b) a second inner surface portion which is directed in the counter direction at an inclination with respect to said first inner surface portion, and (c) a third inner surface portion interconnecting said first and second inner surface portions and recessed from said first and second inner surface portion;

cutting members having cutting edge portions constituting a bottom cutting edge;

said bit body having a flange portion which includes a substantially disk-shaped flange connected to a converging portion, the diameter of which progressively decreases along said axis towards the front end of said bit body;

said substantially disk-shaped flange having a rearwardly facing annular end surface, said annular end surface being formed to contact a front end surface of a drill holding portion of a machine which rotatably holds said bit body substantially over the entire area of said annular end surface.

13. A drill according to claim 9 wherein said third inner surface portion extends to a point near the front end of said flange portion.

14. A drill according to claim 1 or 2, wherein the cross-sectional shapes of said pair of chip-discharging flutes are asymmetrical to each other with respect to said axis when taken along a plane perpendicular to said axis.

15. A drill according to claim 14, wherein the cross-sectional area of one of said chip-discharging flutes is greater than the cross-sectional area of the other of said chip-discharging flutes when taken along a plane perpendicular to said axis.

16. A drill according to claim 15, wherein at least one cutting insert is detachably mounted on the end of each of said chip-discharging flutes such that a cutting edge portion of said cutting insert forms a bottom cutting edge, the cutting inserts mounted on the ends of both chip-discharging flutes being substantially of the same shape and size, the cutting insert mounted on the end of said one of said chip-discharging flutes being radially inwardly offset relative to the other so as to serve as an inner peripheral cutting insert.

17. A drill according to claim 1 or 2, wherein cutting oil discharge openings are formed in a front end surface of said bit body in regions near a trailing edge of the openings of said chip-discharge flutes as viewed in the direction of rotation of said drill, and wherein recesses are formed in the front end surface of said bit body so as to extend along said trailing edges of said openings of said chip-discharging flutes and so as to be recessed axially rearwardly in communication with said chip-discharging flutes, said cutting oil discharge openings being opened in the bottoms of said recesses.

18. A drill according to claim 17, wherein said recess is curved and concaved as viewed in the direction of said edge.

19. A drill according to claim 17 wherein channels are formed in the front end surface of said bit body so as to extend from said cutting oil discharging openings towards the trailing end as viewed in the direction of rotation of said drill into communication with said chip-discharging flutes.

20. A drill, comprising:

a substantially cylindrical bit body;

a pair of chip discharging flutes formed in the outer peripheral surface of said body so as to open in the front end surface of said bit body and so as to extend rearward therefrom along and at both sides of an axis of said bit body;

said flutes being spirally twisted about said axis;

cutting members having edge portions constituting a bottom cutting edge;

said bit body having a flange portion which includes a converging portion, the diameter of which progressively decreases along said axis towards the front end of said bit body;

said flange portion including a substantially disk-shaped flange connected to said converging portion and having a rearwardly facing annular end surface, said annular end surface being formed to contact a front end surface of a drill holding portion of a machine which rotatably holds said bit body substantially over the entire area of said annular end surface; and cutting oil passage bores formed in lands defined between said chip-discharging flutes at a front end portion of said bit body, said cutting oil passage bores extending linearly at an inclination with respect to said axis in accordance with the twist of said chip-discharging flutes.

21. A drill, comprising:

a substantially cylindrical bit body;

a pair of chip discharging flutes formed in the outer peripheral surface of said body so as to open in the front end surface of said bit body and to extend rearward therefrom along and at both sides of an axis of said bit body;

said chip-discharging flutes having a first inner surface portion which is directed in the direction of rotation of said drill, a second inner surface portion which is directed in the counter direction at an inclination with respect to said first inner surface portion, and a third inner surface portion interconnecting said first and second inner surface portions and recessed from said first and second inner surface portions, and wherein angles of intersection between said first and third inner surface portions and between said second and third inner surface portions are obtuse;

cutting members having edge portions constituting a bottom cutting edge;

said bit body having a flange portion which includes a substantially disk-shaped flange connected to a converging portion having a diameter that progressively decreases along said axis towards the front end of said bit body;

said substantially disk-shaped flange having a rearwardly facing annular end surface, said annular end surface being formed to contact a front end surface of a drill holding portion of a machine which rotatably holds said bit body substantially over the entire area of said annular end surface.

22. A drill, comprising:

a substantially cylindrical bit body;

a pair of chip discharging flutes formed in the outer peripheral surface of said body so as to open in the front end surface of said bit body and to extend rearward therefrom along and at both sides of an axis of said bit body;

said chip-discharging flutes having an inner surface which includes: (a) a first inner surface portion which is directed in the direction of rotation of said drill, (b) a second inner surface portion which is directed in a counter direction at an inclination with respect to said first inner surface portion, and (c) a third inner surface portion interconnecting said first and second inner surface portions and recessed from said first and second inner surface portions, wherein said inner surface has a substantially arcuate cross section when taken along a plane perpendicular to said axis;

cutting members having edge portions constituting a bottom cutting edge;

said bit body having a flange portion which includes a substantially disk-shaped flange connected to a converging portion having a diameter that progressively decreases along said axis towards the front end of said bit body;

said substantially disk-shaped flange having a rearwardly facing annular end surface, said annular end surface being formed to contact a front end surface of a drill holding portion of a machine which rotatably holds said bit body substantially over the entire area of said annular end surface.

23. A drill, comprising:

a substantially cylindrical bit body;

a pair of chip discharging flutes helically twisted about an axis of said body and formed in the outer peripheral surface of said body opening in the front end surface of said bit body and extending rearward therefrom along and at both sides of an axis of said bit body;

said chip-discharging flutes being twisted not greater than 90° over the entire length of said chip-discharging flutes;

cutting members having edge portions constituting a bottom cutting edge;

said bit body having a flange portion which includes a substantially disk-shaped flange connected to a converging portion which is configured so that the rate of reduction in the radius is progressively increased along said axis toward the front end of said bit body;

said substantially disk-shaped flange having a rearwardly facing annular end surface, said annular end surface being formed to contact a front end surface of a drill holding portion of a machine which rotatably holds said bit body substantially over the entire area of said annular end surface.

24. A drill, comprising:

a substantially cylindrical bit body;

a pair of chip discharging flutes helically twisted about an axis of said body and formed in the outer peripheral surface of said body so as to open in the front end surface of said bit body and to extend rearward therefrom along and at both sides of an axis of said bit body;

cutting members having edge portions constituting a bottom cutting edge;

said bit body having a flange portion which includes a substantially disk-shaped flange connected to a converging portion which is configured so that the rate of reduction in the radius is progressively increased along said axis toward the front end of said bit body;

said substantially disk-shaped flange having a rearwardly facing annular end surface, said annular end surface being formed to contact a front end surface of a drill holding portion of a machine which rotatably holds said bit body substantially over the entire area of said annular end surface; and inner surface portions of said chip-discharging flutes extending near a front end of said flange portion.

25. A drill, comprising:

a substantially cylindrical bit body, a pair of chip discharging flutes formed in the outer peripheral surface of said body so as to open in the front end surface of said bit body and to extend rearward therefrom along and at both sides of an axis of said bit body, and cutting members having the same cutting edge portions constituting a bottom cutting edge, said bit body having a flange portion which includes a converging portion the diameter of which progressively decreases along said axis towards the front end of said bit body and a substantially disk-shaped flange connected to said converging portion and having a rearwardly facing annular end surface, said annular end surface being formed to contact a front end surface of a drill holding portion of a machine which rotatably holds said bit body substantially over the entire area of said annular end surface, wherein cutting oil discharge openings are formed in a front end surface of said bit body in regions near a trailing edge of the openings of said chip-discharge flutes as viewed in the direction of rotation of said drill, wherein recesses are formed in the front end surface of said bit body so as to extend along said trailing edges of said openings of said chip-discharging flutes and so as to be recessed axially rearwardly in communication with said chip-discharging flutes, said cutting oil discharge openings being opened in the bottoms of said recesses.

26. A drill according to claim 25, wherein said recess is curved and concaved as viewed in the direction of said edge.

* * * * *